United States Patent [19]

Luzzi et al.

[11] 4,360,967

[45] Nov. 30, 1982

[54] ASSEMBLY TOOL FOR ELECTRICAL CONNECTORS

[75] Inventors: Glenn J. Luzzi, Mount Bethel, Pa.; James E. Cole, Jr., Washington, N.J.

[73] Assignee: Amerace Corporation, New York, N.Y.

[21] Appl. No.: 221,780

[22] Filed: Dec. 31, 1980

[51] Int. Cl.[3] .............................................. B23P 19/04

[52] U.S. Cl. ........................................ 29/758; 29/240; 81/474; 173/12

[58] Field of Search ................. 29/758, 764, 745, 407, 29/240; 81/474; 173/1, 12

[56] References Cited

U.S. PATENT DOCUMENTS

| | | | |
|---|---|---|---|
| 1,106,752 | 8/1914 | Tornberg | 81/177 G |
| 2,989,881 | 6/1961 | Lavietes | 81/177 |
| 4,202,591 | 5/1980 | Borgstrom | 339/111 |
| 4,242,930 | 1/1981 | Myers et al. | 81/474 |

*Primary Examiner*—Carl E. Hall
*Assistant Examiner*—P. W. Echols
*Attorney, Agent, or Firm*—Arthur Jacob; David Teschner; Richard A. Craig

[57] ABSTRACT

A tool for use by an operator in the field in attaching and securing a bushing assembly within an electrical connector and subsequently connecting or disconnecting the electrical connector and a terminal of an electrical apparatus to establish a connection from a remote location through the use of an insulated implement, such as a hot-stick. The tool includes an operating member with a wrenching configuration for engaging a complementary wrenching arrangement in the bushing assembly, a wrenching portion for direct wrenching of the operating member and a torque responsive device through which the insulated implement is coupled to the operating member to enable rotation of the insulated implement relative to the operating member upon exceeding a predetermined torque indicative of the appropriate seating of the electrical connector upon the terminal so that such relative rotation serves as an indication to the operator that the connection is complete.

15 Claims, 7 Drawing Figures

ASSEMBLY TOOL FOR ELECTRICAL CONNECTORS

The present invention relates generally to the connection and disconnection of high voltage electrical connector elements in the field and pertains, more specifically, to an assembly tool for facilitating the installation of a bushing assembly within an electrical connector and the subsequent appropriate seating of the electrical connector upon a terminal of an electrical apparatus, preferably from a remote location through the use of an insulated implement, such as a hot-stick.

In U.S. Pat. No. 4,202,591, granted May 13, 1980, there is described a high voltage electrical connector of the type employed to connect a high voltage cable to the terminal of an electrical apparatus, such as a transformer, in a power distribution circuit. The electrical connector is provided with a bushing assembly which enables a ground connection to be made so as to ground the terminal without disconnecting the electrical connector. Also disclosed in the patent is a tool for grounding the electrical connector and then disconnecting the electrical connector from the terminal. In a U.S. patent application entitled ATTACHMENT ARRANGEMENT FOR HIGH VOLTAGE ELECTRICAL CONNECTOR, Ser. No. 221,779, filed of even date herewith and assigned to the assignee hereof, there is described an attachment arrangement which facilitates attachment and securing of a bushing assembly to an electrical connector and subsequent attachment and securing of the electrical connector to a terminal of an electrical apparatus, the attachment arrangement including sequentially operated threaded elements and minimum torque responsive devices for assuring that the sequence of operation of the threaded elements will secure the bushing assembly appropriately to the electrical connector and then will secure the electrical connector to the terminal.

It is an object of the present invention to provide a tool for facilitating the installation of a bushing assembly within an electrical connector and subsequently connecting the electrical connector to a terminal of a high voltage electrical apparatus.

Another object of the invention is to provide a tool as described and which can be used in connection with an insulated implement, such as a hot-stick, for operation from a remote location, to effect connection or disconnection of the electrical connector and the terminal.

Still another object of the invention is to provide a tool as described and which indicates to the operator when the electrical connector is appropriately seated upon the terminal and the connection is completed correctly.

Yet another object of the invention is to provide a tool as described and which enables the application of a sufficient removal torque for disconnecting the electrical connector from the terminal.

A further object of the invention is to provide a tool of the type described and which is relatively simple in construction and is easy to use in the field.

A still further object of the invention is to provide a tool of the type described and which is rugged and durable so as to perform satisfactorily under conditions encountered in the field over a relatively long and useful service life.

The above objects, as well as still further objects and advantages, are attained by the present invention which may be described briefly as a tool for use by an operator in attaching and securing a bushing assembly within an electrical connector and subsequently connecting and disconnecting the electrical connector and a terminal of an electrical apparatus from a remote location through the use of an insulated implement, such as a hot-stick, the connecting and disconnecting being accomplished through the wrenching of a threaded fastener having a wrenching configuration thereon, the tool assuring that the connection is complete so as to establish a desired electrical contact and interference fit between the electrical connector and the terminal, the tool comprising: an elongate operating member having opposite ends; a wrenching configuration at one of the opposite ends, the wrenching configuration being complementary to the wrenching configuration of the threaded fastener for wrenching engagement therewith; wrenching means adjacent the other of the opposite ends enabling direct wrenching of the operating member for attaching and securing the bushing assembly within the electrical connector; attachment means for enabling selective attaching of the tool to the insulated implement; and a torque responsive device coupling the attachment means with the other of the opposite ends of the operating member, the torque responsive device enabling rotation of the attachment means relative to the operating member only upon exceeding a predetermined torque indicative of the appropriate seating of the electrical connector upon the terminal with the desired electrical contact and interference fit therebetween so that such relative rotation serves as an indication to the operator that the connection is complete.

The tool further may include direct-coupling means for directly coupling the attachment means to the elongate operating member in one direction of rotation of the tool such that a torque exceeding the selected torque can be applied to the operating member in said one direction only, by the insulated implement attached at the attachment means, the one direction being that which effects disconnection of the electrical connector from the terminal.

The invention will be more fully understood, while still further objects and advantages will become apparent, in the following detailed description of an embodiment of the invention illustrated in the accompanying drawing, in which.

Figure 1:
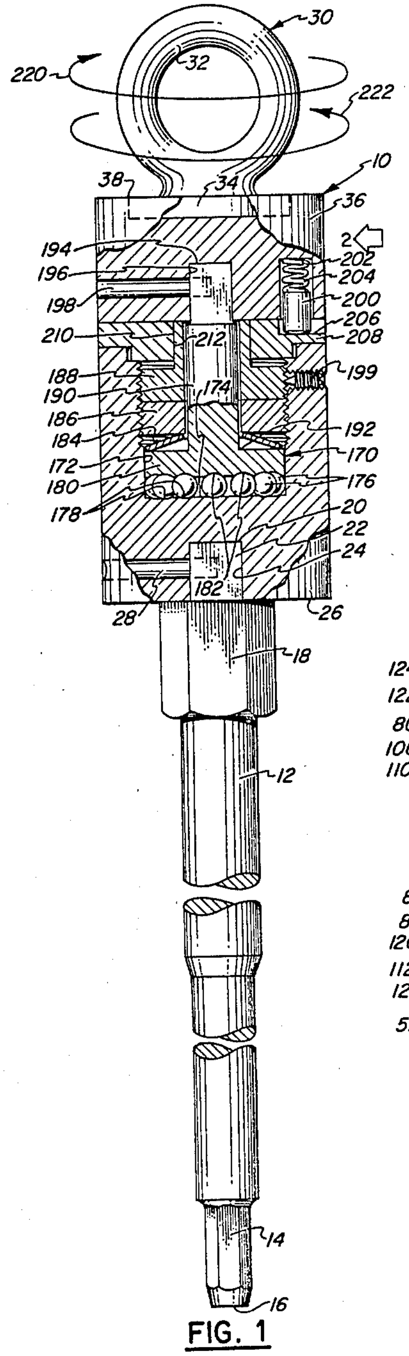
FIG. 1 is an elevational view, partially sectioned, of a tool constructed in accordance with the invention.
Figure 2:
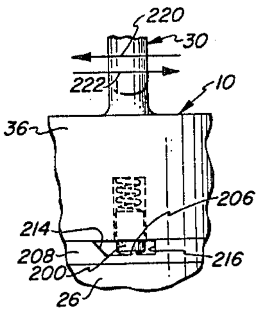
FIG. 2 is a fragmentary elevational view of a portion of the tool of FIG. 1 taken in the direction of arrow 2.

Referring now to the drawing, and especially to FIGS. 1 and 2 thereof, a tool constructed in accordance with the invention is shown at 10 and is seen to include an operating member in the form of elongate rod 12 having a wrenching configuration in the form of a hexagonal key 14 at the lowermost end 16 of the rod 12 and wrenching means in the form of a hexagonal drive head 18 adjacent the uppermost end 20 of rod 12. A projection 22 at the uppermost end 20 of rod 12 has a square cross-sectional configuration and is received within a complementary square socket 24 within a cylindrical first body member 26 of tool 10. A pin 28 secures the rod 12 to the first body member 26.

An attachment means in the form of a pad eye 30, which includes a ring 32 and a plate 34, is affixed to a cylindrical second body member 36 of tool 10, as by welding at 38, and second body member 36 is coupled to first body member 26 by means which will be explained in greater detail below. Pad eye 30 enables tool 10 to be attached to an insulated implement, such as a hot-stick, in the manner explained fully in the aforesaid U.S. Pat. No. 4,202,591, so that tool 10 may be operated by an operator (not shown) from a remote location.

The operation of tool 10 is best understood by reference to the functions performed by the tool. Turning now to FIGS. 3 through 7, there is illustrated an installation procedure in which a bushing assembly 40 is attached and secured within an electrical connector in the form of a T-shaped receptacle 42, and the receptacle 42 is connected to a terminal 44 (see FIGS. 6 and 7) of a high voltage apparatus, such as a transformer (not shown). The installation procedure is described in detail in the aforesaid patent application, Ser. No. 221,779, filed of even date herewith, and portions of the procedure are repeated herein to illustrate the use of tool 10 in the procedure.

Figure 3:
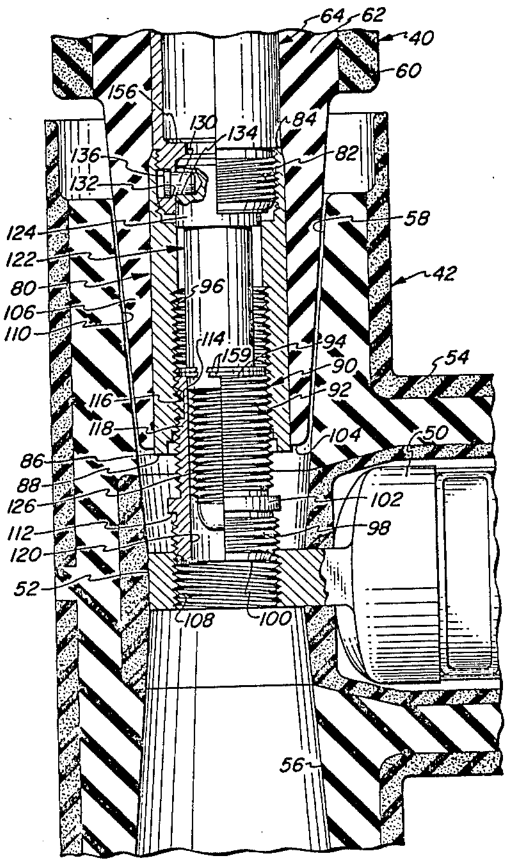
FIG. 3 is a fragmentary elevational cross-sectional view, in slightly reduced scale, showing portions of a bushing assembly about to be installed within an electrical connector.
Figure 4:
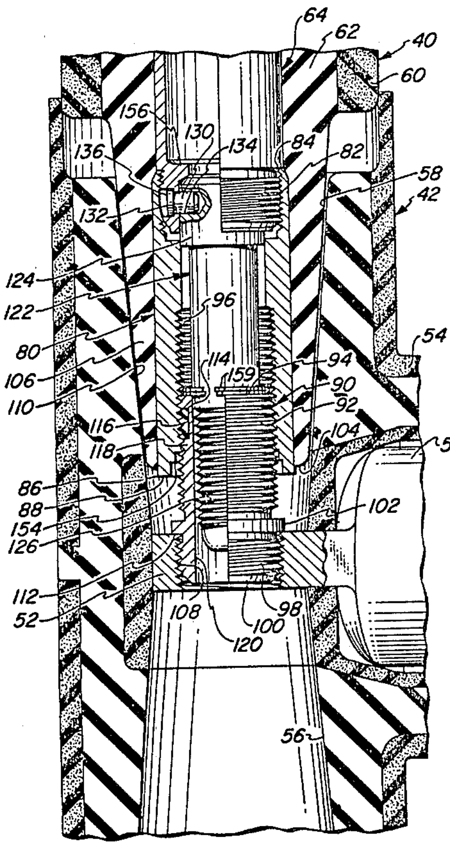
FIG. 4 is a fragmentary elevational cross-sectional view similar to FIG. 3, but with the bushing assembly partially installed.

Referring first to FIGS. 3 and 4, receptacle 42 is affixed to the terminus of a high voltage cable, in the manner illustrated in the aforesaid patent, and an electrical terminal contact 50 having an integral lug 52 is attached to the conductor of the cable. Lug 52 is to be connected to the terminal 44 to complete a distribution circuit.

A composite body 54 surrounds the contact 50 and provides an axially extending receptacle recess 56 within which terminal 44 is to be received. A second axially extending recess 58, opposite to the first recess 56, is to receive interface bushing assembly 40 which is constructed to enable direct connection between the terminal 44 and a commonly available electrical connector, such as an elbow receptacle (not shown).

Bushing assembly 40 includes a generally tubular housing 60 having a body member 62 of dielectric material, such as an insulating elastomer, and a central tubular member 64 of conductive material, such as copper or aluminum. The upper end portion 66 of the bushing assembly 40 is essentially the same as that shown in the aforesaid patent. Thus, a female contact assembly 68 is located within the tubular member 64 and includes a female contact element 72 which can receive a complementary male contact element (not shown) for completing an electrical circuit to tubular member 64. In the present bushing assembly 40, tubular member 64 is provided with an extension in the form of an axially extending tubular extension member 80 affixed to tubular member 64 by means of a threaded connection 82 at the upper end 84 of tubular extension member 80. The lower end 86 of tubular extension member 80 includes a land 88 for purposes which will be described in greater detail below.

A coupling member 90 is received within extension member 80, adjacent lower end 86, and is coupled to extension member 80 by means of an external thread 92 which extends axially to upper end 94 of coupling member 90 and engages a complementary internal thread 96 in extension member 80. A further external thread 98 extends along the coupling member 90 adjacent the lower end 100 thereof and a collar 102 is located axially between the external threads 92 and 98.

Prior to the installation of bushing assembly 40 within the recess 58 of receptacle 42, coupling member 90 projects beyond the lower end 86 of extension member 80, and the lower end 104 of body member 62 of bushing assembly 40, with collar 102 spaced axially from lower ends 86 and 104, as illustrated in FIG. 3. In this manner, external thread 98 is spaced far enough downwardly from the tapered portion 106 of the body member 62 of bushing assembly 40 to enable external thread 98 to be engaged with a complementary threaded aperture 108 in lug 52 of contact 50, as seen in FIG. 3, without resistance which might otherwise occur if the tapered portion 106 of the body member 62 were to contact the corresponding tapered portion 110 of recess 58. Thus, external thread 98 of coupling member 90 may be threaded into threaded aperture 108 merely by turning bushing assembly 40 manually to advance external thread 98 into threaded aperture 108. Such advancement is continued until a sufficient axial length of thread 98 is engaged within threaded aperture 108 to provide the holding strength necessary to complete the installation of bushing member 40, as described below, and preferably until a stop shoulder 112 on collar 102 is seated against lug 52, as seen in FIG. 4.

Preferably, manual turning of bushing assembly 40 will advance the coupling member 90 into threaded aperture 108 until stop shoulder 112 is seated properly against lug 52. A locking means is provided between the external thread 92 and the internal thread 96 to lock the coupling member 90 and the tubular extension member 80 against movement relative to one another during threading of the coupling member 90 into the lug 52, at least until the aforesaid sufficient axial length of thread 98 is engaged within threaded aperture 108. The locking means is in the form of a pellet 114 of synthetic resin material, such as nylon, placed within a recess 116 in the wall 118 of coupling member 90 and compressed against internal thread 96 of tubular extension member 80 to establish a prevailing torque which preferably is great enough to preclude the unwanted relative movement. in order to effect continued rotation of the bushing assembly 40, preferably after stop shoulder 112 is seated against lug 52, the prevailing torque provided by pellet 114 is overcome so that downward movement of the tapered body portion 106 into complementary tapered portion 110 of recess 58 can be continued. Thus, the pllet 114 provides a locking means which is responsive to a minimum torque, the minimum torque being of a predetermined value which will assure that the coupling member 90 is sufficiently engaged with lug 52, and preferably engaged up to the position where stop shoulder 112 is seated against the lug 52, before tubular extension member 80 will move relative to coupling member 90. Pellet 114 assures that the minimum torque necessary to engage coupling member 90 properly in lug 52 and preferably to seat coupling member 90 against lug 52 will be reached before extension member 80 moves relative to coupling member 90.

Upon proper seating of coupling member 90 within lug 52, as seen in FIG. 4, further rotation of bushing assembly 40 will overcome the lock provided by pellet 114 and the tapered body portion 106 of the bushing assembly 40 will begin to engage complementary tapered portion 110 of recess 58. Continued downward movement of the bushing assembly 40 will seat the bushing assembly 40 within the receptacle 42; however, such continued downward movement will meet with considerable resistance as a result of the interference fit which must be established between the complementary tapered portions 106 and 110 in order to attain the desired watertight seal and dielectric properties along the interface between the engaged tapered portions. Since the body member 62 of bushing assembly 40 is constructed of elastomeric materials, it becomes impractical to grip the bushing assembly externally to exert the forces necessary to continue turning the bushing assembly as the resistance to turning increases with downward movement. Thus, an internal wrenching means is provided for facilitating the continued rotation of the bushing assembly 40, as follows.

Figure 5:
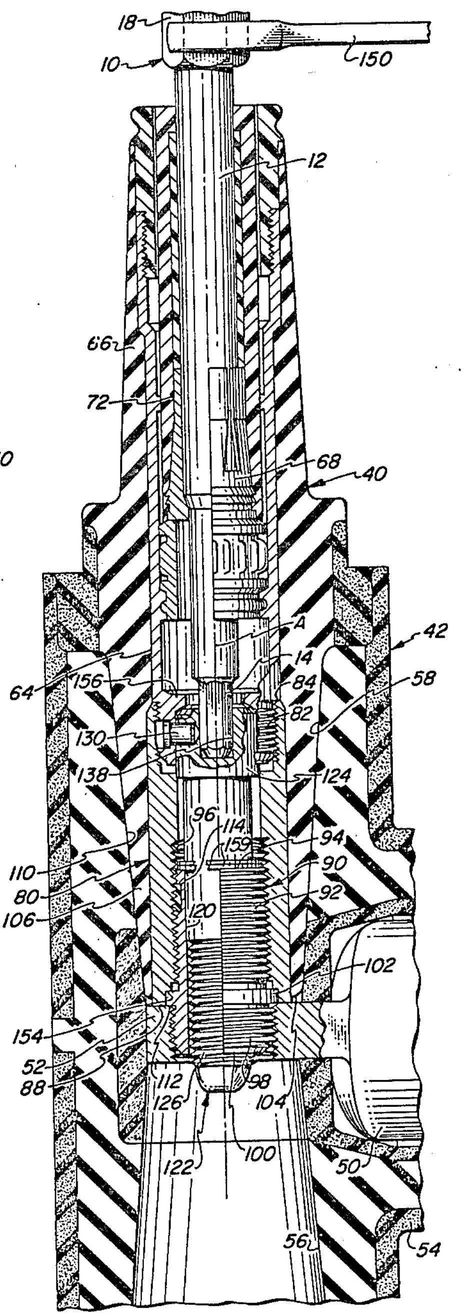
FIG. 5 is a fragmentary elevational cross-sectional view showing the bushing assembly fully installed within the electrical connector, the installation having been facilitated by the tool shown in the figure in slightly reduced scale.

Turning now to FIGS. 4 and 5, coupling member 90 has a central bore 120 passing through the coupling member 90 from end 94 to end 100. A threaded fastener in the form of a bolt 122 extends axially within the bore 120 and has a head 124 and a thread 126. A securing means in the form of a pin 130 extends radially through an aperture 132 in the wall of tubular member 64 and into a corresponding hole 134 in the head 124 of bolt 122, the pin 130 having a flanged end 136 which serves to locate the pin 130 radially within aperture 132. Tubular extension member 80 overlaps the aperture 132 thereby capturing flanged end 136 of pin 130 within aperture 132. Bolt 122 thus is fixed in the retracted position illustrated in FIGS. 4 and 5.

A socket 138 in head 124 of bolt 122 provides a hexagonal wrenching configuration located along the central axis A of the bushing assembly 40. Tool 10, having elongate rod 12 with complementary hexagonal key 14, is lowered through the female contact assembly 68 and tubular member 64, along axis A, as seen in FIG. 5, and key 14 is inserted into socket 138. Once the rod 12 of the tool 10 is coupled with the head 124 of bolt 122, as shown in FIG. 5, a wrench 150 is engaged with drive head 18 to effect rotation of rod 12 about axis A. Concomitant rotation will be imparted to bushing assembly 40 by virtue of the fact that bolt head 124 is secured to tubular member 64 by pin 130. Wrenching forces then are applied and transmitted to move bushing assembly 40 downwardly until the land 88 at the lower end 86 of the tubular extension member 80 is seated against lug 52, as shown in FIG. 5, the collar 102 fitting within a corresponding recess 154 at the lower end 86 of extension member 80. If stop shoulder 112 of collar 102 has not yet been seated properly against lug 52, downward movement of extension member 80 now will carry coupling member 90 downwardly to assure proper seating of the coupling member 90 within lug 52. Once the land 88 is seated properly, the bushing assembly 40 will be seated within the receptacle 42 with the appropriate inteference fit.

It is important that the bushing assembly 40 not be overtightened; that is, the land 88 must not gaul the lug 52 and excessive forces should not be developed along the interface between the complementary tapered portions 106 and 110. At the same time, it is important that at least a minimum torque is applied sufficient to assure proper seating of bushing assembly 40 within receptacle 42. In order to preclude the application of excessive wrenching forces upon the bushing assembly 40, while assuring that the necessary minimum wrenching forces are applied, the shear strength of pin 130 is chosen so that pin 130 will shear in response to the application by tool 10 of a torque in excess of a given value determined by the minimum torque required for the appropriate seating of bushing assembly 40 within receptacle 42 and the maximum torque which can be tolerated. Thus, pin 130 serves as a securing means for securing the head 124 of bolt 122 to tubular member 64 for applying wrenching torque, and the securing means releases in response to exceeding a given torque to preclude the application of an excessive torque to the connection between the bushing assembly 40 and the lug 52 while assuring that the necessary minimum torque is applied.

Figure 6:
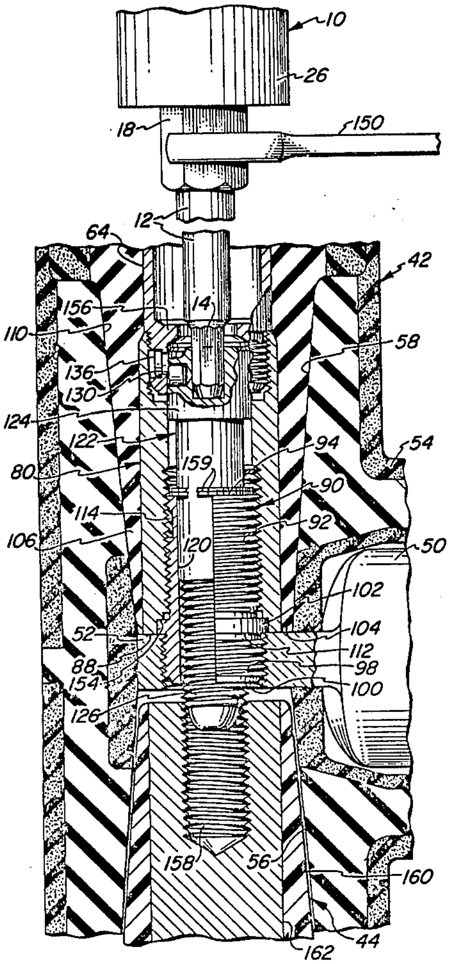
FIG. 6 is a fragmentary elevational cross-sectional view similar to FIG. 5, but showing the electrical connector partially installed upon the terminal of an electrical apparatus.
Figure 7:
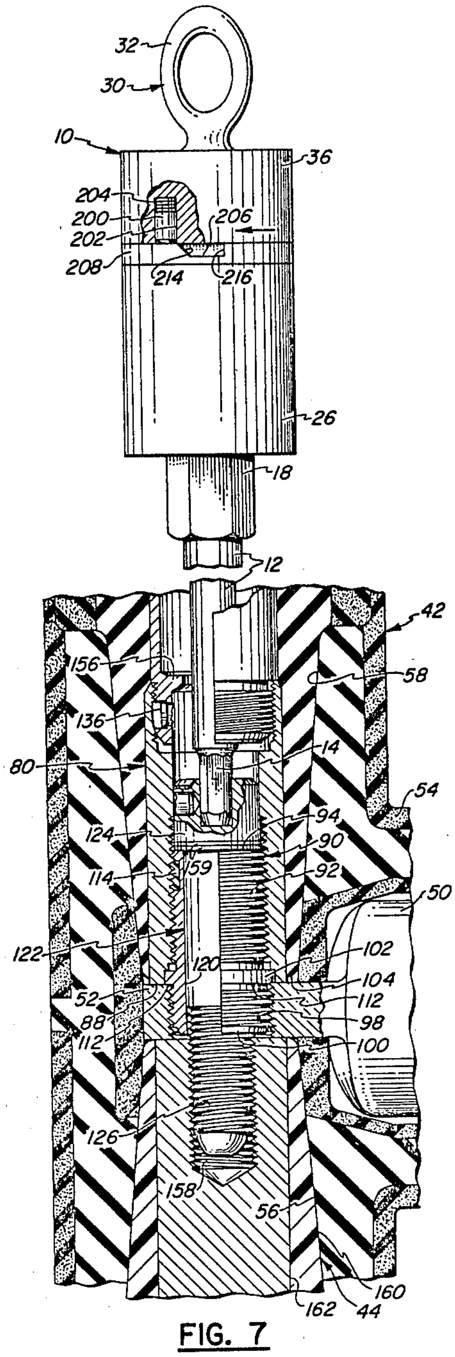
FIG. 7 is a fragmentary elevational cross-sectional view similar to FIG. 6, but with the electrical connector fully connected to the terminal.

Once the pin 130 is sheared, bolt 122 is free to move axially downwardly within tubular extension member 80 and coupling member 90, as seen in FIG. 6. It is noted that axially upward movement of bolt 122 is restricted by a lip 156 which projects radially inwardly to preclude movement of bolt 122 upwardly into tubular member 64 beyond lip 156. The receptacle 42, with bushing assembly 40 in place therein, ordinarily will be placed upon terminal 44 with the bolt 122 aligned axially with a threaded aperture 158 in terminal 44. Upon freeing of the bolt 122 by shearing of the pin 130, the bolt 122 will drop to the position illustrated in FIG. 6, in preparation for connection of the receptacle 42 to terminal 44. It is noted that pin 130 has been sheared by the torque applied by wrench 150 directly through drive head 18 to rod 12 and consequently to pin 130 through bolt head 124. In order to complete the connection of receptacle 42 to terminal 44, bolt 122 is threaded into aperture 158 of terminal 44, as shown in FIG. 7. In the completed connection, the head 124 of bolt 122 bears against washers 159 which rest upon the upper end 94 of coupling member 90 such that bolt 122 clamps lug 52 in place upon terminal 44 with an appropriate interference fit established at the interface between the recess 56 of the receptacle 42 and the corresponding outer surface 160 of the terminal 44. Tool 10 is operated to complete the connection between the receptacle 42 and the terminal 44 and to assure the operator that the appropriate interference fit has been established.

In order to complete the connection between the receptacle 42 and terminal 44, the operator will remove wrench 150 from drive head 18 and will attach an insulated implement, such as a hot-stick, (not shown) to pad eye 30 so that the tool 10 can be rotated about axis A through manipulation of the insulated implement. Pad eye 30 is affixed to second body member 36 of tool 10 which, in turn, is coupled to first body member 26 so that, ordinarily, rotation of pad eye 30 will result in concomitant rotation of rod 12 and hexagonal key 14 to move receptacle 42 downwardly into engagement with terminal 44. As the outer surface 160 of the terminal 44 is engaged in an interference fit with recess 56 of the receptacle 42, the torque required for continued turning and further downward movement is increased. Since a certain predetermined torque must be reached in order to assure that lug 52 properly electrically contacts the conductor 162 of terminal 44 and the appropriate interference fit is attained between the receptacle 42 and the terminal 44, tool 10 provides a torque responsive coupling device between pad eye 30 and rod 12 for indicating to the operator when the predetermined torque has been reached.

Thus, first body member 26 includes therein a torque limiting mechanism 170 which is coupled to second body member 36 and allows second body member 36 to rotate relative to first body member 26 when the torque applied to pad eye 30 exceeds the aforesaid predetermined torque. The operator knows that he must continue to apply more and more torque to the pad eye 30 as long as both the first and second body members 26 and 36 continue to turn together. As soon as the operator observes that the second body member 36 is rotating relative to the first body member 26, he knows that the connection is completed, with the appropriate contact made between lug 52 and conductor 162 and the desired interference fit between the receptacle 42 and the terminal 44, and rotation can be discontinued. The same torque limiting mechanism 170 also serves to preclude overtightening of the connection.

Torque limiting mechanism 170 is best illustrated in FIG. 1. First body member 26 includes a cylindrical bore 172 having a bottom 174. A plurality of load bearing elements, shown in the form of balls 176 are located in a ring around the bottom 174, each ball ordinarily being seated within a complementary recess 178 in the bottom 174 of bore 172. A drive disk 180 rests upon balls 176 and includes a plurality of recesses 182 corresponding to the number of balls 176 and being complementary thereto so that each ball 176 ordinarily is seated within a recess 182, as well as within a recess 178. Resilient biasing means in the form of a spring washer 184 is urged against the drive disk 180 by a retainer 186 which is threaded axially into bore 172 and against the spring washer 184 to bias the drive disk 180 against the balls 176. A drive shaft 190 is integral with drive disk 180 at lower end 192 ot the drive shaft 190 and extends upwardly to an upper end 194 where the drive shaft 190 is received within a complementary socket 196 in second body member 36 and is affixed to the second body member 36, as by a spring pin 198.

Upon rotation of pad eye 30 and second body member 36, drive shaft 190 will be rotated and will cause drive disk 180 to rotate. As long as the torque necessary to rotate rod 12 remains below the predetermined torque, drive disk 180 will be coupled to first body member 26 by virtue of balls 176 in recesses 178 and 182. However, when the torque necessary to rotate rod 12 exceeds the predetermined torque, further rotation of drive disk 180 will be resisted by balls 176 and drive disk 180 will be urged axially upwardly against the bias of spring washer 184 to enable drive disk 180 to ride over the balls 176 to continue to be rotated in response to rotation of second body member 36 and drive shaft 190, while the first body member 26, and rod 12, remain stationary. The value of the torque at which relative rotation is permitted between the first and second body members 26 and 36 is determined by the axial biasing force of spring washer 184 and may be set by appropriate adjustment of the axial position of retainer 186. Once that axial position is determined, retainer 186 is locked into place by a threaded locking member 188 which is threaded into bore 172 and abutted with retainer 186 to lock retainer 186 in place. A set screw 199 assures that locking member 188 is fixed in place relative to first body member 26.

When it is desired to employ tool 10 to remove bolt 122 from threaded aperture 158 of terminal 44, it may become necessary to exert a torque upon bolt 122 greater than the predetermined torque with which the bolt 122 was tightened. Since such removal also should be accomplished from a remote location through the manipulation of tool 10 with an insulated implement, such as a hot-stick, tool 10 is provided with means for directly coupling the first body member 26 with the second body member 36 when the pad eye 30 is rotated in a direction opposite to the direction of rotation employed during the above-described installation procedure.

As best seen in FIGS. 1 and 2, the direct coupling means includes a drive tooth 200 located within a hole 202 in second body member 36 and resiliently biased by a helical spring 204 downwardly into a groove 206 located in a plate 208 placed between the first and second body members 26 and 36. Plate 208 is secured for rotation with first body member 26 by virtue of a post 210 projecting upwardly from locking member 188 and engaging a complementary drive aperture 212 in plate 208. Post 210 is integral with locking member 188 and has a square cross-sectional configuration which engages a complementary square plan configuration of drive aperture 212 so that plate 208 and first body member 26 will rotate as a unit. As best seen in FIG. 2, groove 206 has a ramp 214 at one circumferential boundary and an axial shoulder 216 at the opposed circumferential boundary.

Upon connection of receptacle 42 with terminal 44, bolt 122 is rotated by rotation of tool 10 in the direction of arrow 220 in FIGS. 1 and 2. As long as the predetermined torque, for which torque limiting mechanism 170 is set, is not exceeded first and second body members 26 and 36 will rotate as a unit. When the connection is completed, the predetermined torque will be exceeded and second body member 36 will begin to rotate relative to first body member 26. Drive tooth 200 will then be moved with second body member 36 toward ramp 214 and, since ramp 214 is inclined, drive tooth 200 will ride up ramp 214 to be retracted into hole 202, against the bias of spring 204, so as to ride along plate 208, as seen in FIG. 7, thereby permitting rotation of second body member 36 relative to first body member 26.

Upon disconnection of receptacle 42 from terminal 44, bolt 122 will be rotated by rotation of tool 10 in the direction of arrow 222 in FIGS. 1 and 2. Since it probably will be necessary to exceed the aforesaid predetermined torque, second body portion 36 will begin immediately to rotate relative to first body portion 26, carrying drive tooth 200 toward axial shoulder 216. Once drive tooth 200 abuts axial shoulder 216, second body member 36 will be locked for rotation with plate 208 which, in turn, is engaged for rotation with first body member 26. Thus, sufficient torque will be transmitted to rod 12 from pad eye 30 to loosen bolt 122 for removal and disconnection of receptacle 42 from terminal 44.

It will be seen that tool 10 provides a relatively simple, yet rugged device for use in the field by a workman for attaching and securing a bushing assembly 40 to a receptacle 42, for connecting the receptacle with a terminal 44 with the desired interference fit, from a remote location utilizing an insulated implement, such as a hot-stick, and for disconnecting the receptacle from the terminal from a remote location.

It is to be understood that the above detailed description of an embodiment of the invention is provided by way of example only. Various details of design and construction may be modified without departing from the true spirit and scope of the invention as set forth in the appended claims.

The embodiments of the invention in which an exclusive property or privilege is claimed are defined as follows:

1. A tool for use by an operator in attaching and securing a bushing assembly within an electrical connector and subsequently connecting and disconnecting the electrical connector and a terminal of an electrical apparatus from a remote location through the use of an insulated implement, such as a hot-stick, the connecting and disconnecting being accomplished through the wrenching of a threaded fastener having a wrenching configuration thereon, the tool assuring that the connection is complete so as to establish a desired electrical contact and interference fit between the electrical connector and the terminal, said tool comprising:

an elongate operating member having opposite ends;

a wrenching configuration at one of the opposite ends, the wrenching configuration being complementary to the wrenching configuration of the threaded fastener for wrenching engagement therewith;

wrenching means adjacent the other of the opposite ends for direct wrenching of the operating member for attaching and securing the bushing assembly within the electrical connector;

attachment means for selective attaching of the tool to the insulated implement; and a torque responsive device coupling the attachment means with the other of the opposite ends of the operating member, the torque responsive device enabling rotation of the attachment means relative to the operating member only upon exceeding a predetermined torque indicative of the appropriate seating of the electrical connector upon the terminal with the desired electrical contact and interference fit therebetween so that such relative rotation serves as an indication to the operator that the connection is complete.

2. The invention of claim 1 wherein the tool extends axially from an uppermost end to a lowermost end, the attachment means is located at the uppermost end, and the wrenching configuration is located at the lowermost end.

3. The invention of claim 2 wherein the attachment means comprises a pad eye.

4. The invention of claim 2 wherein the wrenching configuration comprises a wrenching key.

5. The invention of claim 4 wherein the wrenching key has a hexagonal configuration.

6. The invention of claim 1 wherein the tool includes first and second body members located axially adjacent one another:

the elongate operating member is affixed to the first body member;

the attachment means is affixed to the second body member; and the torque responsive device is located in one of the body members and is coupled to the other of the body members such that upon exceeding the predetermined torque, one of the body members will rotate relative to the other body member.

7. The invention of claim 6 wherein the first and second body members are cylindrical and extend along a common central axis.

8. The invention of claim 1 including direct-coupling means for directly coupling the attachment means to the elongate operating member in one direction of rotation of the tool such that a torque exceeding the selected torque can be applied to the operating member in said one direction only, by the insulated implement attached at the attachment means, said one direction being that which effects disconnection of the electrical connector from the terminal.

9. The invention of claim 8 wherein the tool includes first and second body members located axially adjacent one another:

the elongate operating member is affixed to the first body member;

the attachment means is affixed to the second body member; and the torque responsive device is located in one of the body members and is coupled to the other of the body members such that upon exceeding the predetermined torque, one of the body members will rotate relative to the other body member.

10. The invention of claim 9 wherein the direct-coupling means is located axially between the first and second body members.

11. The invention of claim 10 wherein the direct-coupling means includes a drive tooth carried by one of the body members and means resiliently biasing the drive tooth into engagement with further means coupling the drive tooth with the other of the body members.

12. The invention of claim 11 wherein:

the further means coupling the drive tooth with the other of the body members includes a groove extending circumferentially between opposed boundaries;

a ramp at one of the opposed boundaries for urging the drive tooth out of the groove, against the resilient biasing means; and an axial shoulder at the other of the opposed boundaries for abutment by the drive tooth when the drive tooth is moved by rotation of the tool in said one direction of rotation.

13. The invention of claim 12 wherein the tool extends axially from an uppermost end to a lowermost end, the attachment means is located at the uppermost end, and the wrenching configuration is located at the lowermost end.

14. The invention of claim 13 wherein the attachment means comprises a pad eye.

15. The invention of claim 13 wherein the wrenching configuration comprises a wrenching key.

* * * * *

UNITED STATES PATENT AND TRADEMARK OFFICE

CERTIFICATE OF CORRECTION

PATENT NO. : 4,360,967

DATED : November 30, 1982

INVENTOR(S) : Glenn J. Luzzi; James E. Cole, Jr.

It is certified that error appears in the above—identified patent and that said Letters Patent is hereby corrected as shown below:

Column 4, line 54 reads
"enough to preclude the unwanted relative movement. in" (emphasis added)

should read
-- enough to preclude the unwanted relative movement. In -- (emphasis added)

Column 4, line 61 reads
"pllet 114 provides a locking means which is responsive" (emphasis added)

should read
-- pellet 114 provides a locking means which is responsive -- (emphasis added)

Signed and Sealed this

*Twenty-second* Day of *February 1983*

|SEAL|

*Attest:*

GERALD J. MOSSINGHOFF

*Attesting Officer* *Commissioner of Patents and Trademarks*